United States Patent [19]
Callahan

[11] Patent Number: 5,201,380
[45] Date of Patent: Apr. 13, 1993

[54] PHASED REDUNDANT SENSOR STEERING CONTROL

[75] Inventor: William L. Callahan, Lafayette, Ind.

[73] Assignee: TRW Inc., Lyndhurst, Ohio

[21] Appl. No.: 728,196

[22] Filed: Jul. 10, 1991

[51] Int. Cl.⁵ ............................................. B62D 5/06
[52] U.S. Cl. ................................. 180/132; 180/142; 364/424.05
[58] Field of Search .................. 180/132, 141, 142; 364/424.05

[56] References Cited

U.S. PATENT DOCUMENTS

| | | |
|---|---|---|
| 3,795,285 | 3/1974 | Scholl et al. |
| 4,771,846 | 9/1988 | Venable et al. |
| 4,802,545 | 2/1989 | Nystuen et al. |
| 4,803,629 | 2/1989 | Noto et al. ............. 364/424.05 |
| 4,860,844 | 8/1989 | O'Neil. |
| 4,865,144 | 9/1989 | North. |
| 4,939,654 | 7/1990 | Kouda et al. ............. 364/424.05 |
| 4,972,320 | 11/1990 | Sugiura et al. ............. 364/424.05 |
| 4,996,657 | 2/1991 | Shiraishi et al. ............. 364/424.05 |
| 5,032,996 | 7/1991 | Shiraishi et al. ............. 364/424.05 |
| 5,113,172 | 5/1992 | Lang ............. 338/174 X |

OTHER PUBLICATIONS

Autommatic Electronic Steering - A New Approach Proceedings - Society of Automotive Engineers p-183, pp. 69-75 Oct. 1986.
Handbook of Position Sensing Products, Donner-Duncan Electronics Division.

*Primary Examiner*—Margaret A. Focarino
*Assistant Examiner*—Kevin Hurley
*Attorney, Agent, or Firm*—Tarolli, Sundheim & Covell

[57] ABSTRACT

A system for controlling a steering motor for turning a steerable vehicle wheel. The system includes a shaft which is angularly rotatable about its longitudinal axis. The system includes a plurality of sensors. Each of the plurality of sensors provides a signal. The signal of each of the plurality of sensors is indicative of the rotational position of the shaft for different portions of a revolution of the shaft. At least one signal is indicative of the rotational position of the shaft for each rotational position of the shaft. The signal of each of the plurality of sensors being non-indicative of the rotational position of the shaft for different and non-overlapping portions of the revolution of the shaft. A control means receives the signals indicative of the rotational position of the shaft. The control means operates the steering motor alternately in response to first and second signals provided by the sensors.

19 Claims, 12 Drawing Sheets

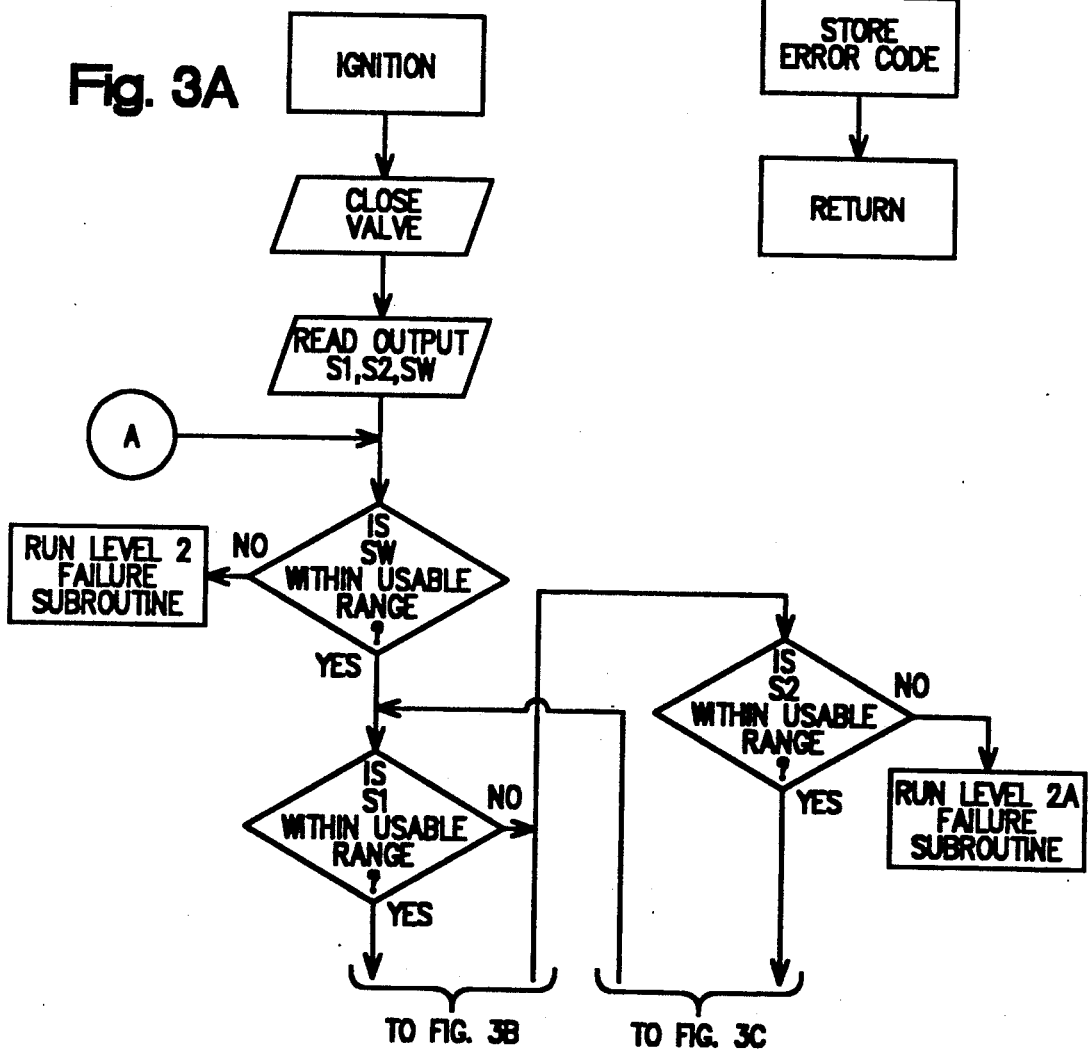

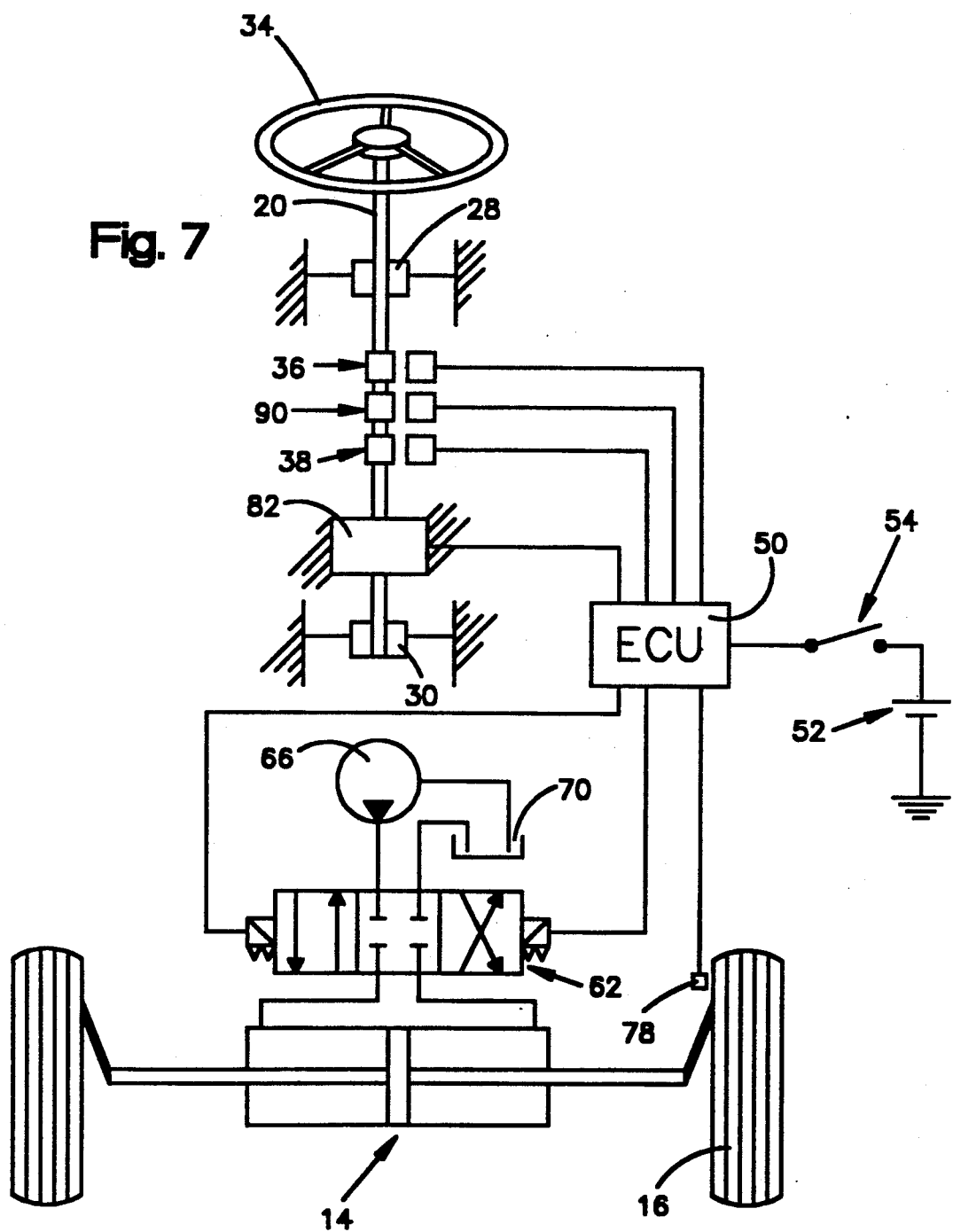

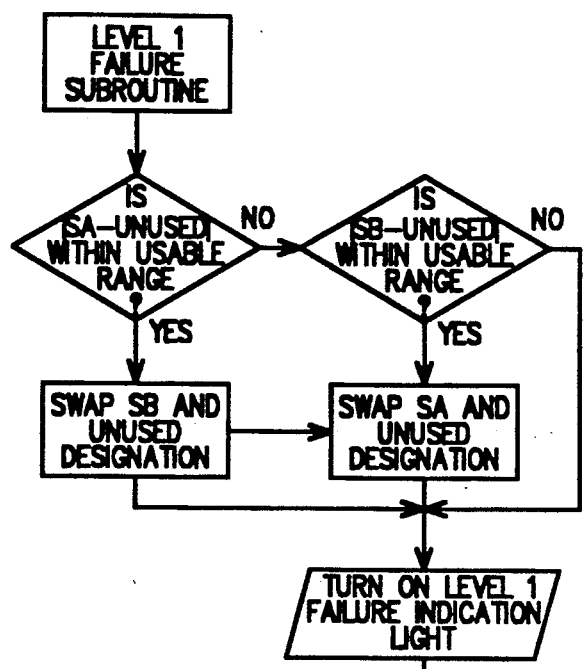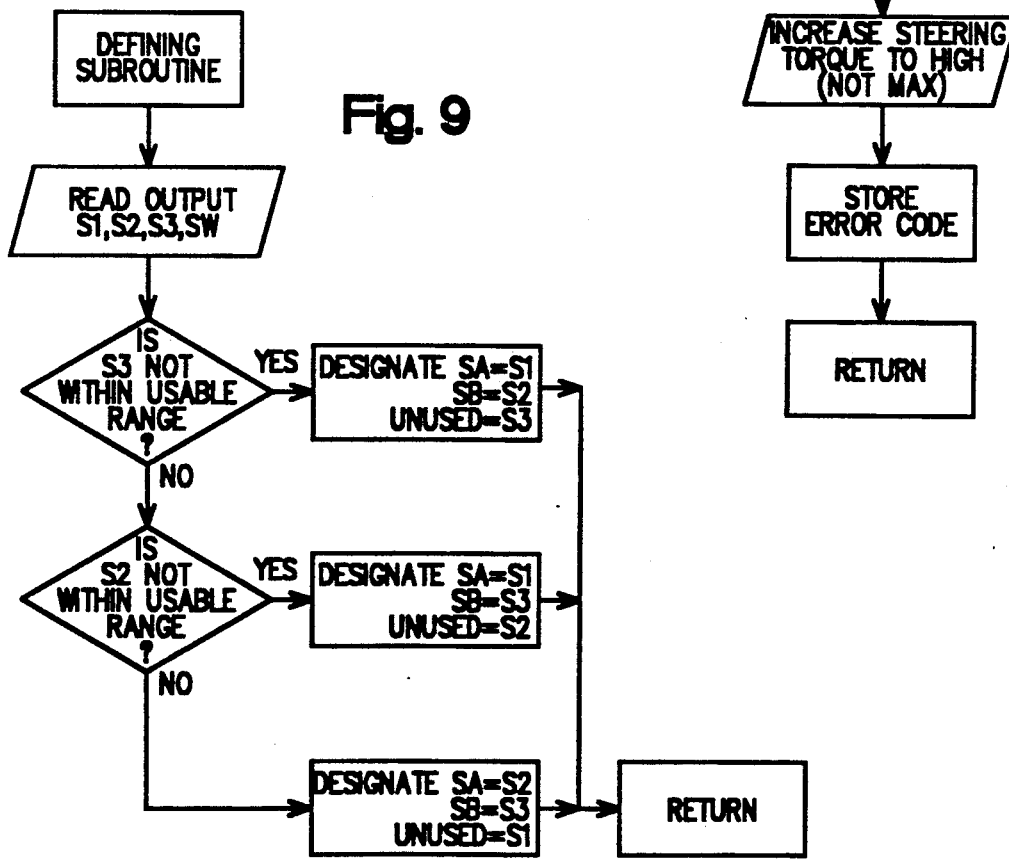

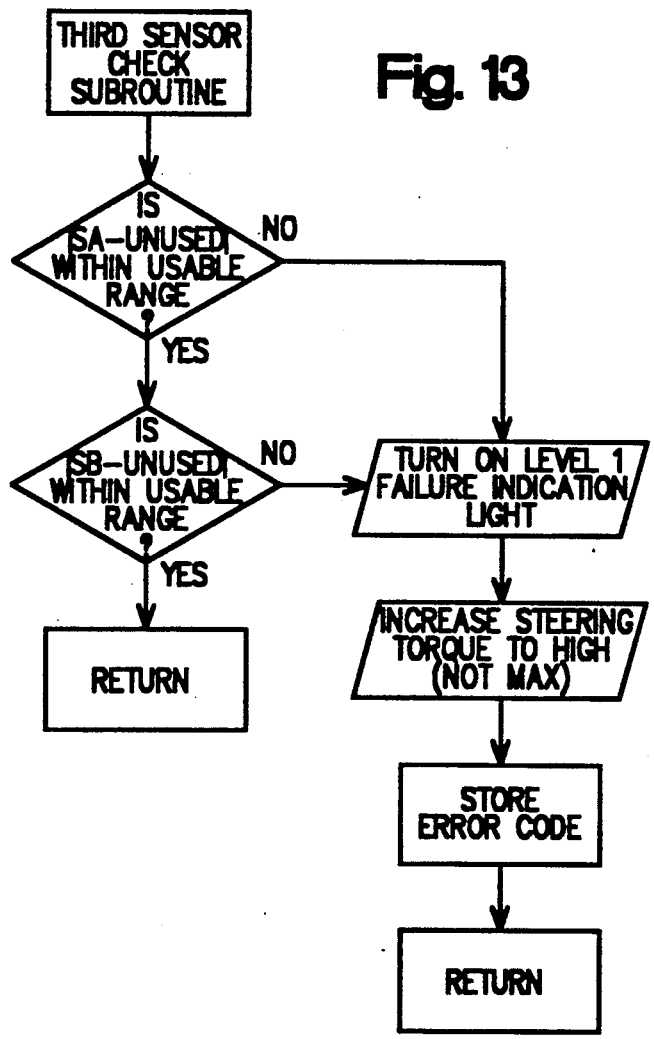

of the rotational position of the shaft is different from the portion of a revolution of the shaft for which the signal of each of the other of the plurality of sensors is indicative of the rotational position of the shaft. At least one of the signals is indicative of the rotational position of the shaft for each rotational position of the shaft.

Also, the signal of each of the plurality of sensors is non-indicative of the rotational position of the shaft for a portion of a revolution of the shaft. The signal of each of the plurality of sensors is non-indicative of the rotational position of the shaft for different portion of a revolution of the shaft. Specifically, the portion of a revolution of the shaft for which the signal of each of the plurality of sensors is non-indicative of the rotational position of the shaft is different from, and does not overlap, the portion of a revolution of the shaft for which the signal of each of the other of the plurality of sensors is non-indicative of the rotational position of the shaft.

The system includes a control means. The control means receives the signals provided by the plurality of sensors. The control means operates the steering motor alternately in response to a first signal provided by one of the plurality of the sensors for a first portion of rotation of the shaft and a second signal provided by another of the plurality of the sensors for a second portion of rotation of the shaft.

Steering control is fully responsive to rotation of the vehicle steering wheel and does not provide a "jerkiness" in the steering because at least one of the signals is indicative of the rotational position of the shaft for each rotational position of the shaft. The plurality of sensors will permit the vehicle to be operated, despite failure of one of the plurality of sensors. Thus, the vehicle can be driven to service facilities despite failure of one of the plurality of sensors.

PHASED REDUNDANT SENSOR STEERING CONTROL

BACKGROUND OF THE INVENTION

The present invention relates to a system for controlling a steering motor for turning steerable vehicle wheels. In particular, the present invention relates to a electro-hydraulic vehicle steering system which does not have a mechanical connection between the vehicle steering wheel and the steerable vehicle wheels.

Electro-hydraulic steering systems which do not have a mechanical connection between the vehicle steering wheel and the steerable vehicle wheels are known. These systems typically include a sensor for sensing rotation of the vehicle steering wheel. A hydraulic actuator is actuated by a control device in response to a signal provided by the sensor for sensing rotation of the vehicle steering wheel. The hydraulic actuator, when actuated turns the steerable vehicle wheel.

The sensor for sensing rotation of the vehicle steering wheel is often a single rotary, electrical potentiometer. The potentiometer is mounted such that the stator of the potentiometer is fixedly attached to a support for the vehicle steering wheel and the rotor of the potentiometer is rotated upon rotation of the vehicle steering wheel. The potentiometer provides an output voltage signal which is linearly proportional to the rotational position of the vehicle steering wheel for a substantial portion of rotation of the vehicle steering wheel. However, the output voltage signal of the potentiometer ceases to be linearly proportional to the rotational position of the steering wheel in regions encompassing the maximum and minimum for the output voltage signal of the potentiometer. Also, the output voltage signal of the potentiometer abruptly changes as the vehicle steering wheel is rotated through a portion of rotation corresponding to a transition or discontinuity zone of the potentiometer. Thus, steering may be either not fully responsive to rotation of the vehicle steering wheel or "jerky."

Also, if the potentiometer fails to provide an output voltage signal, the system becomes inoperative. Such a situation could occur if damage occurs to either the potentiometer or the electrical lead wires for the potentiometer. The vehicle would be rendered unsteerable until the problem is corrected. In such a situation, this could have the unfortunate consequence of stranding the vehicle at a location remote from service facilities.

SUMMARY OF THE INVENTION

The present invention is a system for controlling a steering motor for turning a steerable vehicle wheel in response to turning of a vehicle steering wheel. The system includes a shaft which is angularly rotatable about its longitudinal axis upon rotation of the vehicle steering wheel. The system also includes a plurality of sensors.

Each of the plurality of sensors provides a signal. The signal of each of the plurality of sensors is indicative of the rotational position of the shaft for a portion of a revolution of the shaft. The signal of each of the plurality of sensors is indicative of the rotational position for different portions of a revolution of the shaft. Specifically, the portion of a revolution of the shaft for which the signal of each of the plurality of sensors is indicative of the rotational position of the shaft is different from

BRIEF DESCRIPTION OF THE DRAWINGS

The foregoing and other objects and features of the present invention will become more apparent to one skilled in the art upon reading the following description with reference to the accompanying drawings, in which:

FIGS. 3A-3C are a flow chart illustrating the operation of the system of FIG. 1;

FIG. 4 is a flow chart illustrating a sensor failure subroutine of the system of FIG. 1;

FIG. 7 is a schematic illustration of a second embodiment of a system in accordance with the present invention;

FIG. 9 is a flow chart illustrating an initial sensor designation subroutine of the system of FIG. 7;

FIG. 10 is a flow chart illustrating a sensor failure subroutine system of FIG. 7;

FIG. 13 is a flow chart illustrating an operational characteristic of the system of FIG. 7.

DESCRIPTION OF PREFERRED EMBODIMENT

Figure 1:
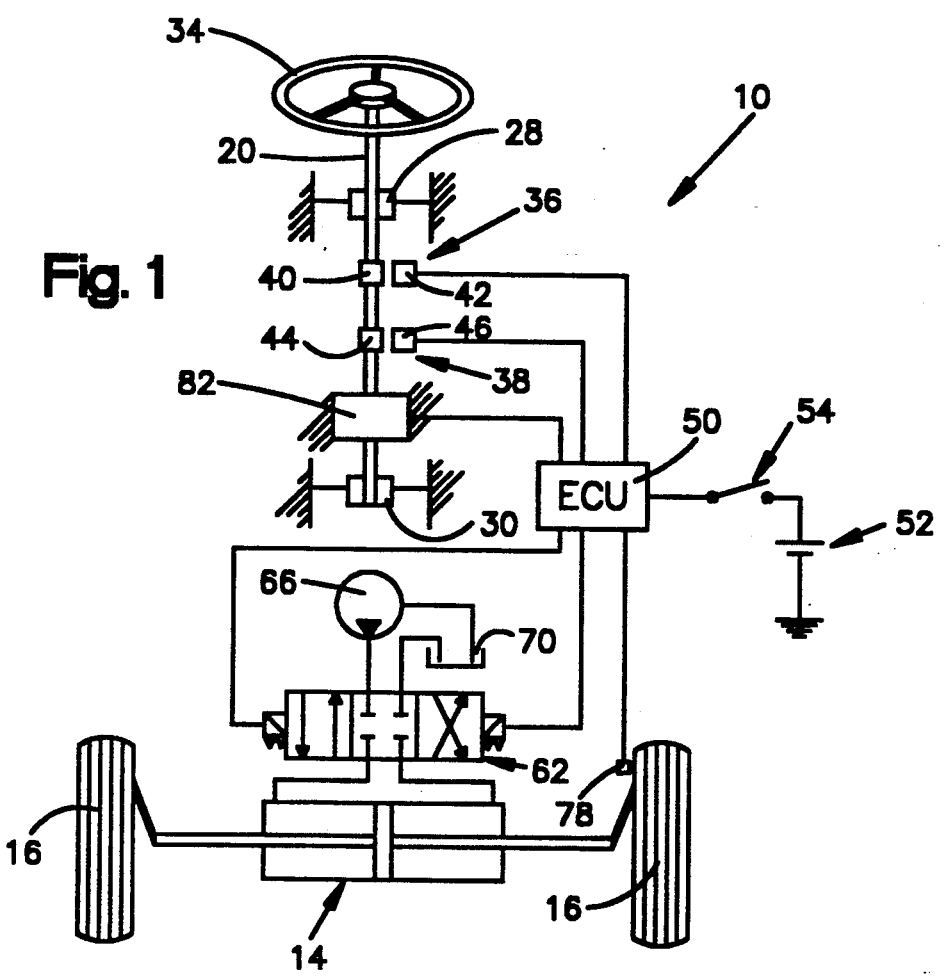
FIG. 1 is a schematic illustration of a first embodiment of a system in accordance with the present invention.

FIG. 1 illustrates a first embodiment of the invention in which a system 10 controls a steering motor 14 of a vehicle. The steering motor 14 turns a pair of steerable vehicle wheels 16. In the preferred embodiment, the steering motor 14 is a bi-directional hydraulic actuator. The steerable vehicle wheels 16 provide for turning of the vehicle in a known manner.

The system 10 includes a rotatable shaft 20. The shaft 20 is supported for rotation relative to the vehicle by bearing bushings 28 and 30. The shaft 20 is connected to and supports a vehicle steering wheel 34. The vehicle steering wheel 34 is rotatable, in both a clockwise and counterclockwise direction, by an operator of the vehicle. Rotation of the vehicle steering wheel 34 rotates the shaft 20. Rotation of the vehicle steering wheel 34 in the clockwise and counterclockwise directions results in turning of the steerable vehicle wheels 16 in opposite directions, as is known.

First and second rotational position sensors 36 and 38 are provided on the shaft 20. In the preferred embodiment, the first and second rotational position sensors 36 and 38 are first and second electrical rotational potentiometers 36 and 38. In practice, the first and second potentiometers 36 and 38 would be in a ganged construction as shown in *Handbook of Position Sensing Products*, Systron Donner-Duncan Electronics Division, page 59. Each of the first and second potentiometers 36 and 38 provides a signal which is indicative of the rotational position of the shaft 20. The first and second potentiometers 36 and 38 are single turn potentiometers with no mechanical stops, as are known.

The first potentiometer 36 includes a rotor 40 which is integral with, or attached to, the shaft 20. The first potentiometer 36 includes a stator 42 which is fixedly mounted to the vehicle. Rotation of the shaft 20 causes the rotor 40 to rotate relative to the stator 42. The second potentiometer 34 similarly includes a rotor 44 and a stator 46.

Figure 2:
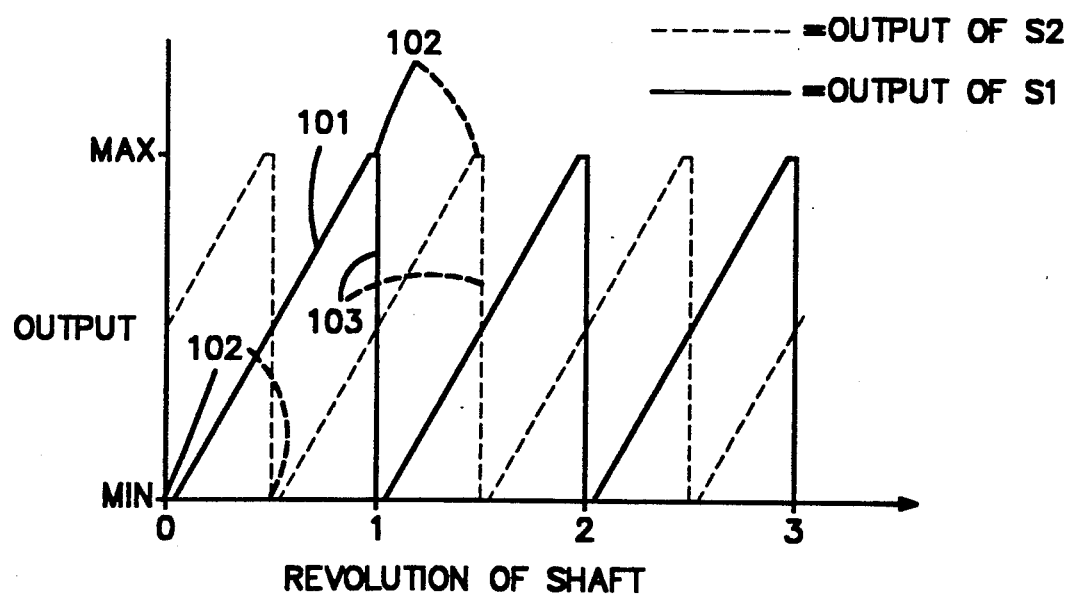
FIG. 2 is a chart graphically illustrating output signals for sensors in the system of FIG. 1.

The signals indicative of the rotational position of the shaft 20 provided by the first and second potentiometers 36 and 38 are electrical voltages. These signals are termed first and second output voltage signals, respectively. The first and second output voltage signals have output patterns, for rotation of the shaft 20, which have a characteristic relationship. FIG. 2 graphically illustrates this relationship, in which the first output voltage signal is designated S1 with an output pattern shown by solid line and the second output voltage signal is designated S2 with an output pattern shown by dashed line.

The output patterns of each of the first and second output voltage signals (S1 and S2) have a rotational position indicative zone 101, a pair of rotational position non-indicative zones 102 and a transition zone 103. These zones of the output patterns will be described with reference to the first output voltage signal (S1), with the understanding that the second output signal (S2) has similar characteristics.

The rotational position indicative zone 101 is the region in which the first output voltage signal (S1) is linearly proportional to the rotation of the shaft 20. With reference to FIG. 2, the first output voltage signal (S1) linearly increases from a minimum to a maximum as the shaft 20 is rotated from a position adjacent a starting reference (0), through a substantial portion of one rotation of the shaft 20, to a position adjacent one rotation from the starting reference (0), i.e. (1). The extent of such a rotation of the shaft 20 is approximately 350°. The linearly varying output voltage is proportional to the rotational position of the shaft 20, and thus, provides information for use to control the steering motor 14.

The two rotational position non-indicative zones 102 are the regions in which the output voltage signal is substantially non-varying. With reference to FIG. 2, the first output voltage signals (S1) is substantially nonvarying for rotational positions adjacent starting reference (0) and adjacent a position which is one rotation from the starting reference (0), i.e. (1). The extents of rotation of the shaft 20 to which the rotational position non-indicative zones 102 correspond are each approximately 5°. The substantially non-varying output voltage is not proportional to the rotational position of the shaft 20, and thus, does not provide useful information to control the steering motor 14.

The transition zone 103 is the region in which the first output voltage signal (S1) abruptly jumps between the maximum and minimum. With reference to FIG. 2, the first output voltage signal (S1) abruptly jumps at a rotational position approximately at one rotation from the starting reference (0), i.e. (1). The extent of rotation which corresponds to the transition zone 103 is minute. The abrupt jump is not proportional to the rotational position of the shaft 20, and thus, does not provide useful information to control the steering motor 14.

The first output voltage signal (S1) will substantially repeat the rotational position indicative zone 101, the two rotational position non-indicative zones 102 and the transition zone 103 for each complete rotation of the shaft 20. Upon rotation of the shaft 14 in the other direction, the pattern is repeated, but in reverse sequence. The first output voltage signal (S1) provides usable information for control of the steering motor 14 when within the rotational position indicative zone 101. The first output voltage signal (S1) has a period of one shaft rotation. Thus, the first output voltage signal has a saw tooth waveform pattern for repeated rotation of the shaft 20 in a single direction.

The second output voltage signal (S2) has similar zones of rotational position indication 101, rotational position non-indication 102 and transition 103. The second output voltage signal (S2) also has a period of one rotation of the shaft 20 and a saw tooth waveform pattern for repeated rotation of the shaft 20. However, the first and second potentiometers 36 and 38 (FIG. 1) are positioned about the axis of the shaft 20 such that they are displaced, rotationally relative to each other, by substantially 180° or one-half rotation of the shaft 20. Thus, as shown graphically in FIG. 2, the output waveform of the second output voltage signal (S2) is shifted over from, or out of phase with, the output waveform of the first output voltage signal (S1) by substantially 180° or one-half rotation of the shaft 20.

It is an important feature of the invention that the output waveforms of the first and second output voltage signals (S1 and S2) are out of phase. As the shaft 20 is rotated at least one of the first and second output voltage signals (S1 and S2) will be within its rotational position indicative zone 101 such that the output voltage signal linearly varies with a change in rotation position of the shaft 20. Thus, by alternately using the first and second output voltage signals (S1 and S2), rotational position non-indicative zone 102 and transition zones 103 can be avoided. The alternating use allows smooth control of the steering motor 14.

The first and second potentiometers 36 and 38 are connected with, and provide the first and second output voltage signals (S1 and S2) to, an electronic control unit (ECU) 50 (FIG. 1). The ECU 50 is powered by a battery 52 of the vehicle. The connection of the ECU 50 to the battery 52 is through an ignition switch 54 which disables the ECU 50 when the ignition is off.

The ECU 50 utilizes the first and second voltage output signals (S1 and S2) from the first and second potentiometers 36 and 38 to control the steering motor 14. The ECU 50 is connected to a known spring centered hydraulic valve 62. The hydraulic valve 62 provides selective communication between the steering motor 14 and a hydraulic pump 66 and an associated reservoir 70.

The control valve 62 remains in a closed or central neutral position (as shown in FIG. 1), when not being controlled by the ECU 50. Hydraulic fluid from the hydraulic pump 66 is not directed to the steering motor 14 when the control valve 62 is in its central neutral position. Displacement of the control valve 62 from the central neutral position causes hydraulic fluid from the hydraulic pump 66 to be directed toward the steering motor 14 to turn the steerable vehicle wheels 16, in a known manner.

Adjacent one of the steerable vehicle wheels 16 is a position sensor 78. The position sensor 78 senses the position of the one of the steerable vehicle wheels 16. The position of the one of the steerable vehicle wheels 16 is indicative of the operational displacement of the steerable vehicle wheels 16 provided by the steering motor 14.

The position sensor 78 is connected with, and provides a steerable vehicle wheel position output signal to, the ECU 50. The ECU 50 utilizes this steerable vehicle wheel position output signal to control the steering motor 14. For purposes of discussion of operation, the steerable wheel position signal will be referred to as SW.

An electromagnetic friction brake 82 is operably connected to the shaft 20. The electromagnetic friction brake 82 provides a sensation of steering feel to the steering wheel 34 for perception by the operator of the vehicle by applying a resistance to rotation of the shaft 20. An electromagnetic friction brake 82 which is suitable for use with the present system is disclosed in U.S. Pat. No. 4,771,846 to Venable et al., entitled "Apparatus for Establishing Steering Feel", assigned to TRW Inc., Cleveland, Ohio. The disclosure of U.S. Pat. No. 4,771,846 is expressly incorporated herein by reference.

Figure 3B:
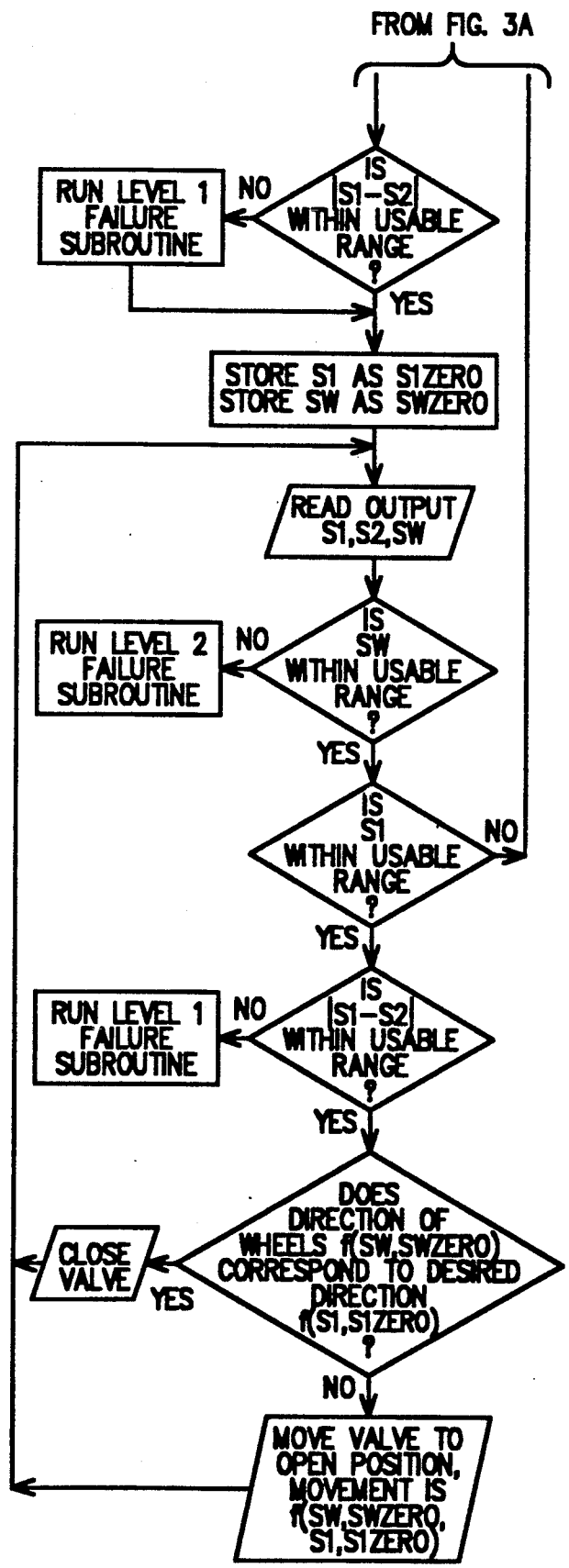
Figure 3C:
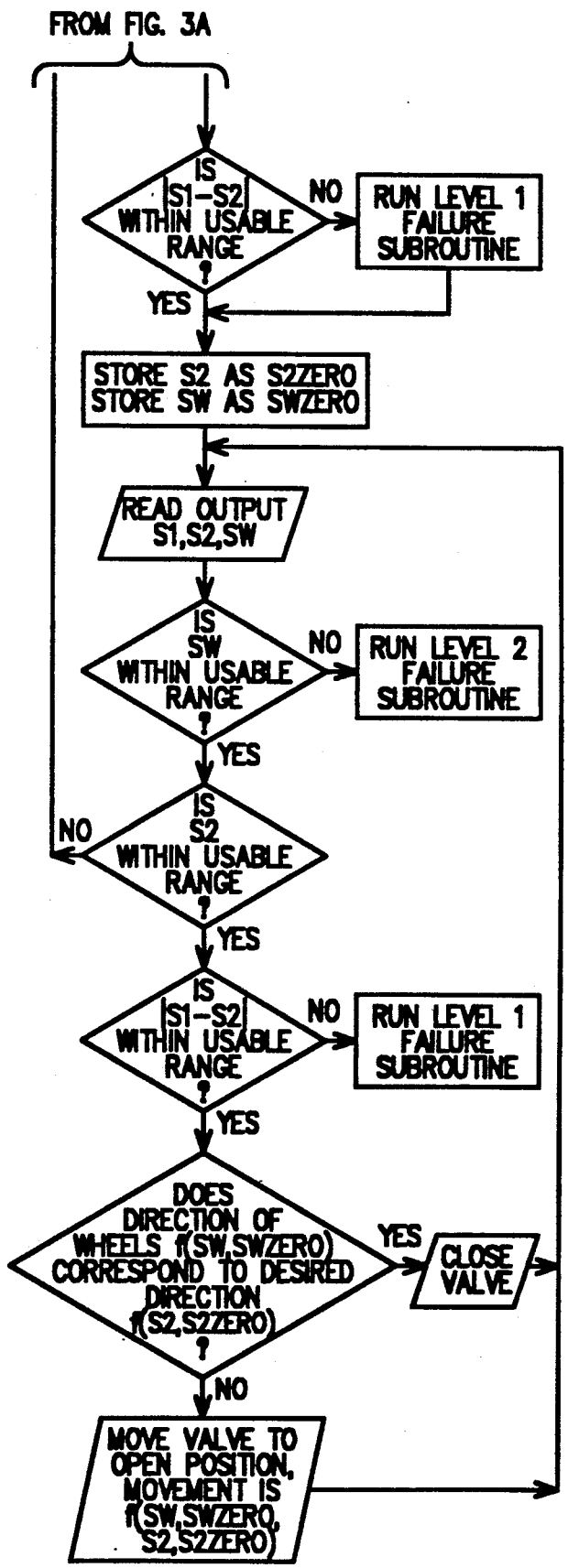

In operation, the ECU 50 performs steps substantially as shown by the flow chart of FIGS. 3A-3C. Upon closing of the ignition switch 54 (FIG. 1), the ECU 50 is provided with power from the battery 52. The ECU 50 controls the hydraulic valve 62 to maintain, or return to, its central neutral position. Thus, hydraulic fluid from the hydraulic pump 66 is not provided to the steering motor 14.

The ECU 50 reads the first and second output voltage signals (hereinafter only referred to as S1 and S2) of the first and second potentiometers 36 and 38, and the steerable vehicle wheel position output signal (hereinafter only referred to as SW) of the position sensor 78. The ECU 50 determines whether SW is within a predetermined usable range. A typical usable range is 0.5 volts to 4.5 volts. This provides a check as to whether position sensor 78 has malfunctioned.

If SW is within its usable range, the ECU 50 determines whether S1 is within a predetermined usable range. The usable range is bound by a value slightly less than the maximum value and a value slightly greater than the minimum value (FIG. 2). A typical usable range is 0.5 volts to 4.5 volts. This determines whether S1 can be utilized by the ECU 50 to control the steering motor 14.

If S1 is within the usable range, the ECU 50 determines whether an absolute value of S1 minus S2 is within a usable range. A typical usable range is 2.3 volts to 2.7 volts. This determines whether there has been a malfunction in either the first or second potentiometers 36 and 38.

If the absolute value of S1 minus S2 is within the usable range, the ECU 50 stores the value of S1 as S1ZERO, and stores the value of SW as SWZERO. The values of S1ZERO and SWZERO are utilized as the references for determining changes in the rotational position of the shaft 20 and the position of the steerable vehicle wheels 16, respectively.

The ECU 50 reads S1, S2 and SW. The ECU determines whether SW is within its usable range. If SW is within its usable range, the ECU 50 determines whether S1 is within its usable range. If S1 is within its usable range, the ECU 50 determines whether the absolute value of S1 minus S2 is within its usable range.

If the absolute value of S1 minus S2 is within its usable range, the ECU 50 determines whether the direction of the steerable vehicle wheels 16, which is a function of SW and SWZERO corresponds to the desired direction of steering, which is a function of S1 and S1ZERO. If the direction of the steerable vehicle wheels 16 corresponds to the desired direction, the ECU 50 controls the hydraulic valve 62 to maintain, or move to, its central neutral position. Thus, hydraulic fluid from the hydraulic pump 66 is not applied to the steering motor 14. However, if the direction of the steerable vehicle wheels 16 does not correspond to the desired direction, the ECU 50 controls the hydraulic valve 62 to move to a position to permit hydraulic fluid from the hydraulic pump 66 to be applied to the steering motor 14. The movement of the hydraulic valve 62 is a function of SW, SWZERO, S1 and S1ZERO, as is known.

The ECU 50 again reads S1, S2 and SW. The ECU 50 again determines whether SW is within its usable range, whether S1 is within its usable range, and whether the absolute value of S1 minus S2 is within its usable range. If all of these determinations are found to be in the affirmative, the ECU 50 will continue to utilize S1 to operate the steering motor 14, in a repetitive manner as described above.

Thus, as shown in FIG. 2, S1 is utilized when S2 is within its rotational position non-indicative zones 102 and its transition zone 103. Also, S1 continues to be utilized when S2 is within its rotational position indicative zone 101, until S1 is not usable. S1 remains usable until the shaft 20 is rotated to a position in which the first potentiometer 36 approaches either zero or maximum for its output voltage signal, or the first potentiometer 36 malfunctions.

If S1 is determined not to be within its usable range, the ECU 50 (FIG. 1) will alternate to utilize S2. This alternation is an important aspect of the invention. The ECU 50 determines if S2 is within its usable range. The usable range is bound by a value slightly less than the maximum value and a value slightly greater than the minimum value (FIG. 2). A typical usable range is 0.5 volts to 4.5 volts.

If S2 is within its usable range, the ECU 50 determines whether the absolute value of S1 minus S2 is within its usable range. If the absolute value of S1 minus S2 is within its usable range, the ECU 50 stores the value of S2 as S2ZERO and store the value of SW as SWZERO. The values of S2ZERO and SWZERO are utilized as the references for determining changes in the rotational position of the shaft 20 and the position of the steerable vehicle wheel 16, respectively.

The ECU 50 reads S1, S2 and SW. The ECU 50 makes a determination whether SW is within its usable range. If SW is within its usable range, the ECU 50 determines whether S2 is within its usable range. If S2 is within its usable range, the ECU 50 determines whether the absolute value of S1 minus S2 is within its usable range.

If the absolute value of S1 minus S2 is within its usable range, the ECU makes a determination as to whether the direction of the steerable vehicle wheels 16, which is a function of SW and SWZERO, corresponds to the desired direction, which is a function of S2 and S2ZERO. If the direction of the steerable vehicle wheels 16 correspond to the desired direction, the ECU 50 controls the hydraulic valve 62 to remain in, or move to, its central neutral position. Thus, hydraulic fluid from the hydraulic pump 66 is not applied to the steering motor 14. However, if the direction of the steerable vehicle wheels 16 does not correspond to the desired direction, the ECU 50 controls the hydraulic valve 62 to move. The movement of the hydraulic valve 62 is a function of SW, SWZERO, S2 and S2ZERO, as is known.

The ECU 50 again reads S1, S2 and SW. The ECU 50 again makes determinations as to whether SW is within its usable range, whether S2 is within its usable range, and whether the absolute value of S1 minus S2 is within its usable range. If all of these determinations are in the affirmative, the ECU 50 will continue to utilize S2 to control the steering motor 14, in a repetitive manner as described above.

Thus, as shown in FIG. 2, S2 is utilized when S1 is within its rotational position non-indicative zones 102 and its transition zone 103. Also, S2 continues to be utilized when S1 is within its rotational position indicative zone 101, until S2 is not usable. S2 remains usable until the shaft 20 is rotated to a position in which the second potentiometer 38 approaches either the minimum or maximum for its output voltage signal, or the second potentiometer 38 malfunctions. When S2 is not usable, the ECU 50 alternates to utilize S1. This alternation is an important aspect of the invention.

Thus, S1 and S2 are used alternately to avoid the rotational position non-indicative zones 102 and the transition zones 103. Each time that the ECU 50 alternates between S1 and S2, a new zero reference is established for the utilized one of S1 and S2. Thus, steering operation is smooth and not "jerky." Also, alternation between S1 and S2 only occurs when necessary, i.e., when the utilized one of S1 and S2 is not within its usable range.

If either the first or second potentiometers 36 and 38 malfunctions, the apparatus 10 can still provide a substantial amount of steering control by utilizing the output voltage signal of the other of the first and second potentiometers 36 and 38. This is an important aspect of the invention, as increased safety is provided. For such a malfunction, the absolute value of S1 minus S2 will not be within its usable range. The ECU 50 will perform what is termed a level 1 failure subroutine, as shown by the flow chart in FIG. 4.

In the level 1 failure subroutine, a level 1 failure indication light is turned on to alert the operator of the vehicle. The ECU 50 controls the electromagnetic friction brake 82 to increase steering torque to high (not maximum). The level 1 failure indication light alerts the operator of the vehicle of the malfunction. The increased steering torque convinces the operator of the vehicle of the need to correct the malfunction. Also, an electronic error code is stored within the ECU 50 to provide information when the vehicle is repaired. The ECU 50 continues to operate to control the steering motor 14 utilizing the output voltage signal of the non-malfunctioning of the first and second potentiometers 36 and 38. Steering control is provided for the range of rotation of the shaft 20 which corresponds to the rotational position indicative zone 101 of the output voltage signal of the non-malfunctioning of the first and second potentiometers 36 and 38.

Figure 5:
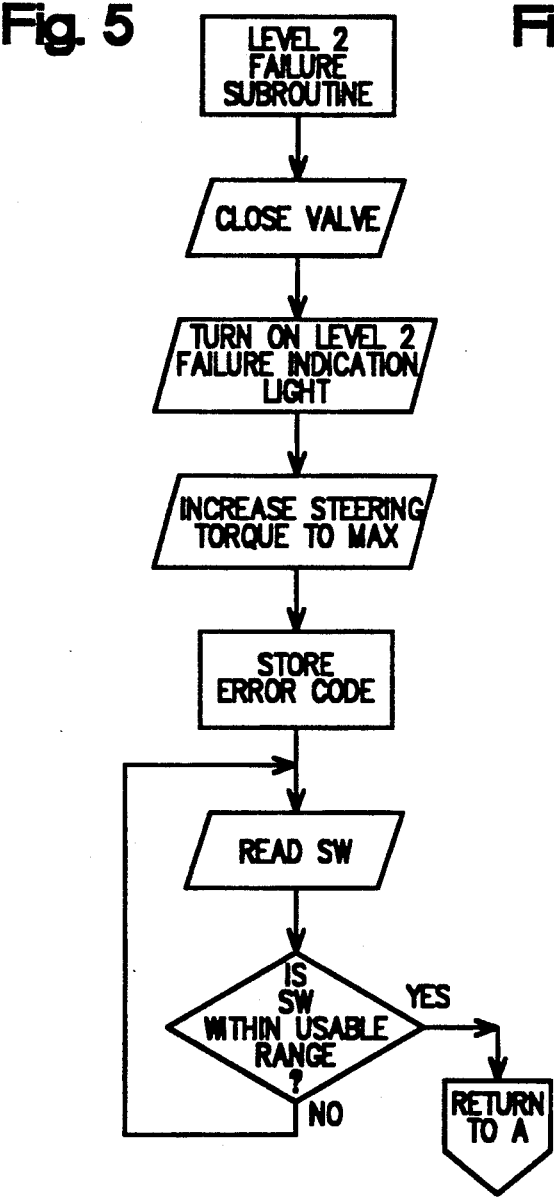
FIG. 5 is a flow chart illustrating another sensor failure subroutine of the system of FIG. 1.

If SW is not within its usable range, the apparatus 10 cannot provide meaningful control for the steerable vehicle wheels 16. Thus, control of the steering motor 14 by the ECU 50 for maneuvering is ceased. The ECU 50 performs what is termed a level 2 failure subroutine, as shown in FIG. 5.

In the level 2 failure subroutine, the ECU 50 controls the hydraulic valve 62 to remain in, or move to, its central neutral position. A level 2 failure indicator light is turned on to alert the operator of the vehicle. The ECU 50 controls the electromagnetic friction brake 82 to increase steering torque to maximum. The operator of the vehicle is alerted to the malfunction by the indicator light and is convinced of the malfunction by the increased steering torque. In addition, the ECU 50 stores an electronic error code to provide information when the vehicle is serviced.

In the level 2 failure subroutine, the ECU 50 reads SW from the position sensor 78. The ECU 50 determines whether SW is within its usable range. If SW is not within its usable range, the ECU 50 will continue to cycle to read SW and make a determination as to whether SW is within its usable range. Thus, the ECU 50 does not move the hydraulic valve 62 from its central neutral position. If SW is determined to be within a usable range, the ECU 50 again controls the steering motor 14, such that the vehicle can be driven to service facilities.

Figure 6:
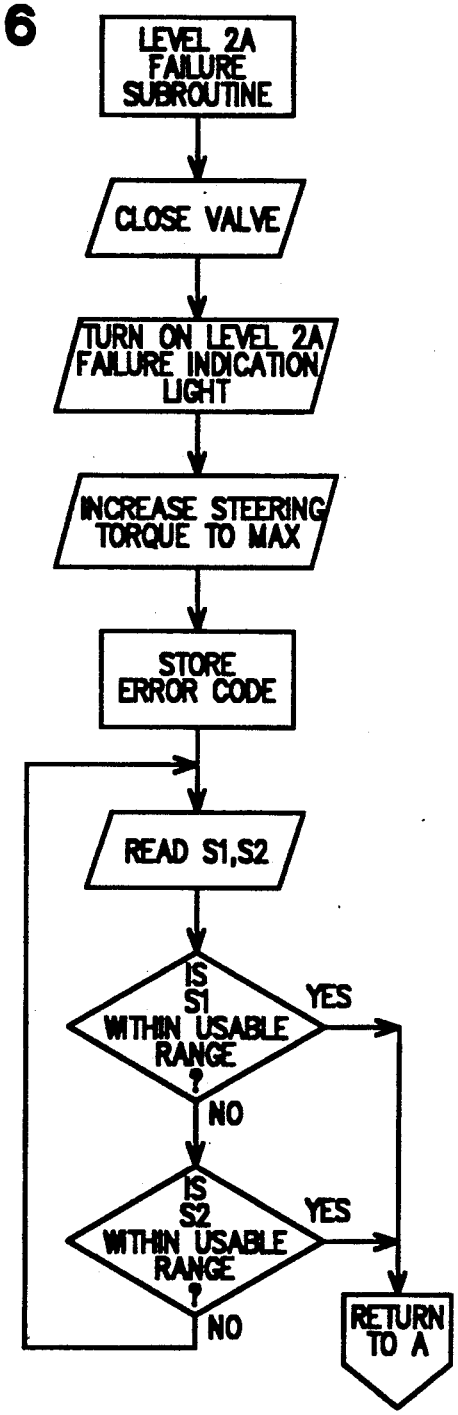
FIG. 6 is a flow chart illustrating still another sensor failure subroutine of the system of FIG. 1.

If both of the first and second potentiometers 36 and 38 malfunction, both S1 and S2 will not be within their usable ranges. The ECU 50 cannot control the steering motor 14 in a meaningful manner. The ECU 50 performs what is termed a level 2A failure subroutine, as shown in FIG. 6.

During the level 2A failure subroutine, the ECU 50 controls the hydraulic valve 62 to remain in, or move to, its central neutral position. A level 2A failure indicator light is turned on to alert the operator of the vehicle. The ECU 50 controls the electromagnetic friction brake 82 to increase steering torque to maximum. The indicator light alerts the operator of the vehicle of the malfunction and the increased steering torque convinces the operator of the vehicle of the malfunction. The ECU 50 also stores an electronic error code to provide information when the vehicle is serviced.

During the level 2A failure subroutine, the ECU 50 reads S1 and S2. The ECU 50 determines whether S1 is within its usable range. If S1 is not within its usable range, the ECU 50 determines whether S2 is within its usable range. If S2 is also not within its usable range, the ECU 50 continues to cycle to read S1 and S2 and make determinations whether S1 and S2 are within their usable ranges. Thus, the ECU 50 does not move the hydraulic valve 62 from its central neutral position. If either S1 or S2 are determined to be within their usable range, the ECU 50 again controls the steering motor 14 such that the vehicle can be driven to service facilities. The ECU 50 utilized the output voltage signal of the non-malfunctioning first and second potentiometers 36 and 38

The second embodiment of the invention, as shown in FIG. 7, is similar to the first embodiment of the invention, and identical identifying numerals have been utilized to designate similar items. However, the second embodiment includes a third rotational position sensor 90. The third rotational position sensor is a potentiometer 90 constructed similar to the first and second potentiometers 36 and 38.

The output voltage signal of the third potentiometer 90 has a similar saw tooth waveform as the output voltage signals of the first and second potentiometers 36 and 38. The output voltage signal of the third potentiometer 90 also has a rotational position indicative zone in which the output voltage signal is linearly proportional to the rotational position of the shaft 20 for approximately 350° of rotation. The output voltage signal of the third potentiometer 90 also has two rotational position nonindicative zones, each of which is approximately 5° and a transitional zone. The output voltage signal of the third potentiometer 90 also has a typical usable range of 0.5 volts to 4.5 volts.

The first, second and third potentiometers 36, 38 and 90 are positioned on the shaft 20 such that their output voltage signals are out of phase approximately 120° from each other. Thus, as the shaft 20 is rotated one rotation, the output voltage signal for each of the first, second and third potentiometers 36, 38 and 90 passes through its transition zone at a rotational position of the shaft 20 which is approximately 120° from the rotational positions for the transition zone of the output voltage signals of the other of the first, second and third potentiometers 36, 38 and 90. Thus, at least two of the first, second and third potentiometers 36, 38 and 90 provide output voltage signals which are within their rotational indicative zones for each rotational position of the shaft 20. This provides for full redundancy to provide for malfunctions and error checking. The output voltage signal of the third potentiometer 90 is designated S3.

Figure 8A:
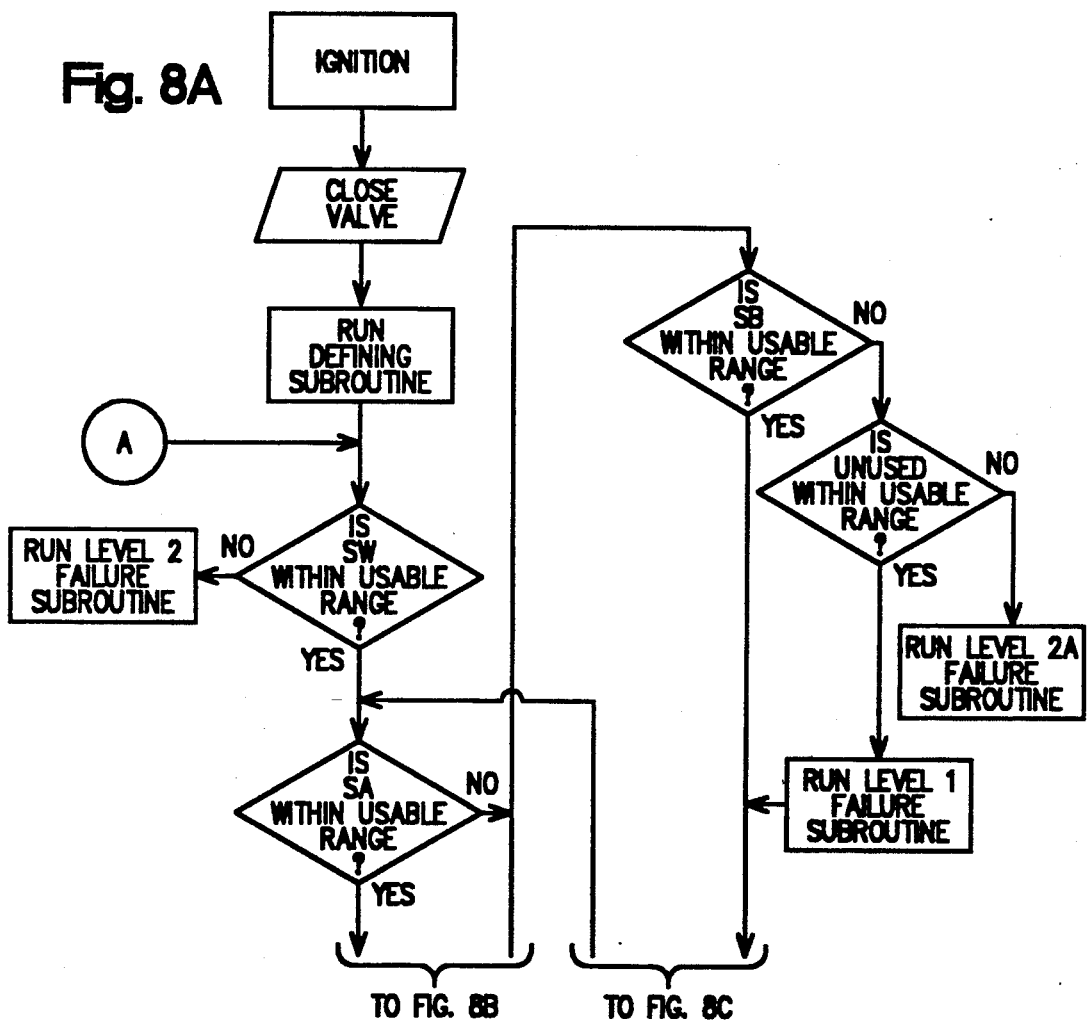
FIGS. 8A-8C are a flow chart illustrating the operation of the system of FIG. 7.
Figure 8B:
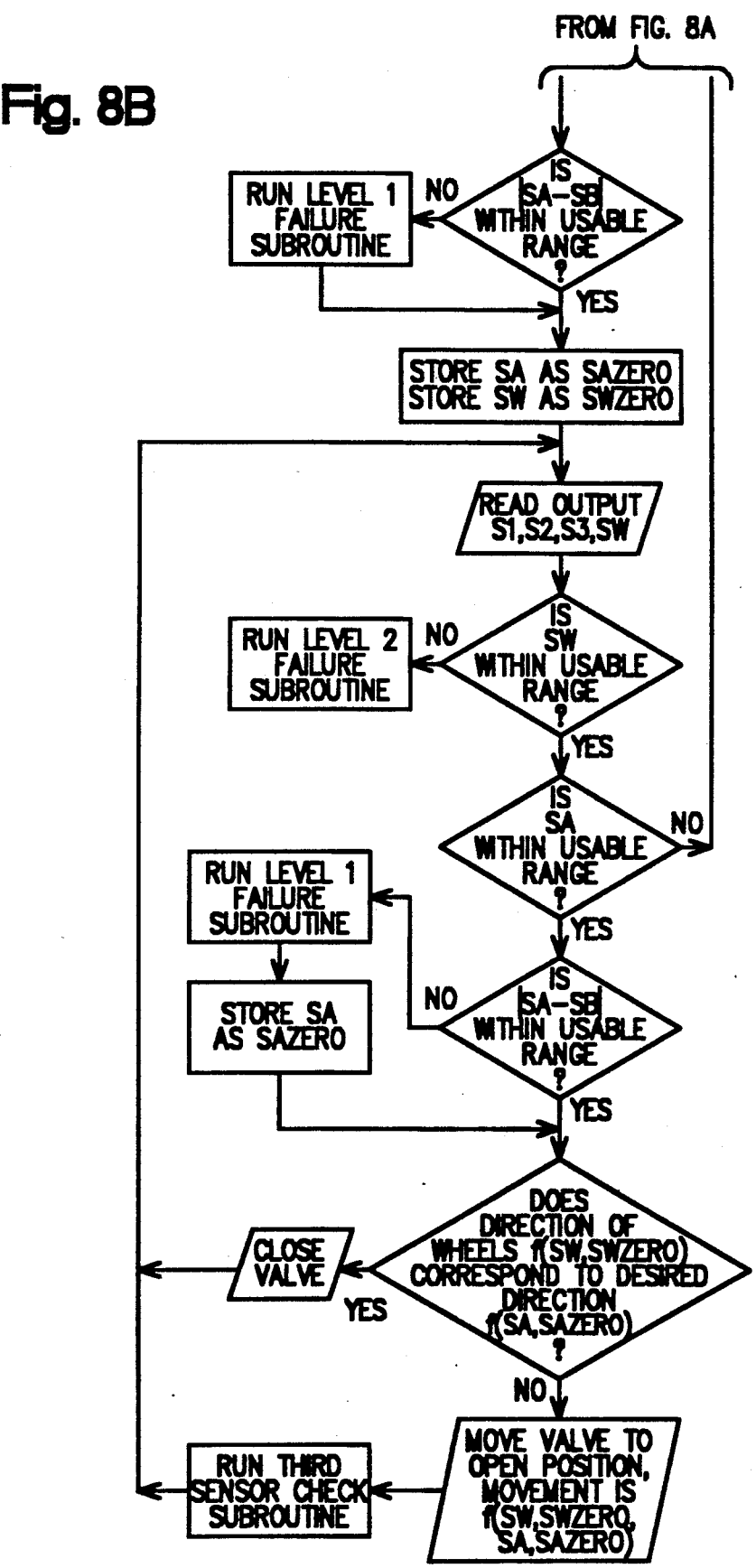
Figure 8C:
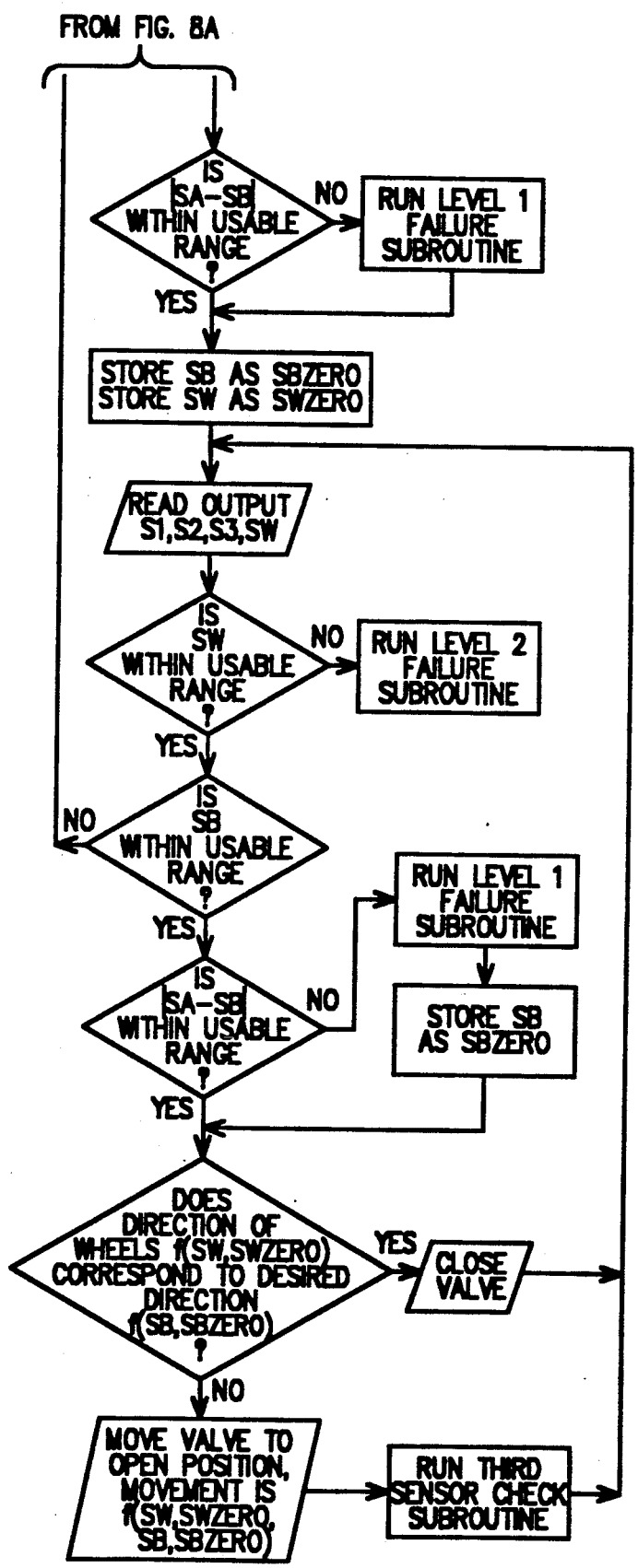

During operation, the ECU 50 performs steps substantially as shown by the flow chart of FIGS. 8A-8C. Upon closing of the ignition 54, the ECU 50 controls the hydraulic valve 62 to remain in, or move to, its central neutral position. The ECU 50 performs what is termed a defining subroutine, as shown in FIG. 9.

The ECU 50 reads S1, S2, S3 and SW. The ECU 50 defines SA, SB and UNUSED based on the values of S1, S2, and S3, a follows. The ECU 50 determines whether S3 is within its usable range. If S3 is not within its usable range, the ECU 50 designates SA as being equal to S1, SB as being equal to S2 and UNUSED being equal to S3. If S3 is within its usable range, the ECU 50 determines whether S2 is within its usable range. If S2 is not within its usable range, the ECU 50 designates SA as being equal to S1, SB as being equal to S3, and UNUSED as being equal to S2. If S3 and S2 are both within their usable ranges, the ECU 50 designates SA as being equal to S2, SB as being equal to S3, and UNUSED as being equal to S1.

Thus, two of the three output voltage signals are utilized by the ECU 50 for alternate control of the steering motor 14. The other of the three output voltage signals is not presently used for steering control, but is held in reserve. After SA, SB and UNUSED are designated, the ECU 50 operates to control the steering motor 14, as shown in the flow chart of FIGS. 8A-8C.

The ECU 50 determines whether SW is within its usable range. If SW is within its usable range, the ECU 50 determines whether SA is within its usable range, e.g., 0.5 volts to 4.5 volts. If SA is within its usable range, the ECU 50 determines whether the absolute value of SA minus SB is within a predetermined usable range. This provides for a check to determine either of the two utilized signals is from a malfunctioning potentiometer. A typical usable range is 1.5 volts to 1.8 volts and 3.2 volts to 3.5 volts. If the absolute value of SA minus SB is within its usable range, the ECU 50 stores the value of SA as SAZERO and the value of SW as SWZERO. The values of SAZERO and SWZERO are utilized as the references for determining changes in the rotational position of the shaft 20 and the position of steerable vehicle wheels 16, respectively.

The ECU 50 reads S1, S2, S3 and SW. The ECU 50 determines whether SW, SA, and the absolute value of SA minus SB all within their usable ranges.

If the absolute value of SA minus SB is not within it usable range, the ECU 50 performs what is termed a level 1 failure subroutine, as shown by the flow chart in FIG. 10. The ECU 50 determines whether the absolute value of SA minus UNUSED is within its usable range. If the absolute value of SA minus UNUSED is within its usable range, the ECU 50 swaps the designation of SB and UNUSED. If the absolute value of SA minus UNUSED is not within its usable range, the ECU 50 determines whether the absolute value of SB minus UNUSED is within its usable range. If the absolute value of SB minus UNUSED is within its usable range, the ECU 50 swaps the designation of SA and UNUSED.

A level 1 failure indicator light is turned on by the ECU 50 to warn the operator of the vehicle of the malfunction. The ECU 50 controls the electromagnetic friction brake 82 to increase steering torque to high (not maximum). The failure indicator light alerts the operator of the vehicle while the increased steering torque convinces the operator of the vehicle of the malfunction. The ECU 50 stores an electronic error code to provide information upon servicing of the vehicle. The ECU 50 reinitialized the zero reference value. The ECU 50 continues to control the steering motor 14, such that the vehicle can be driven to service facilities.

Figure 11:
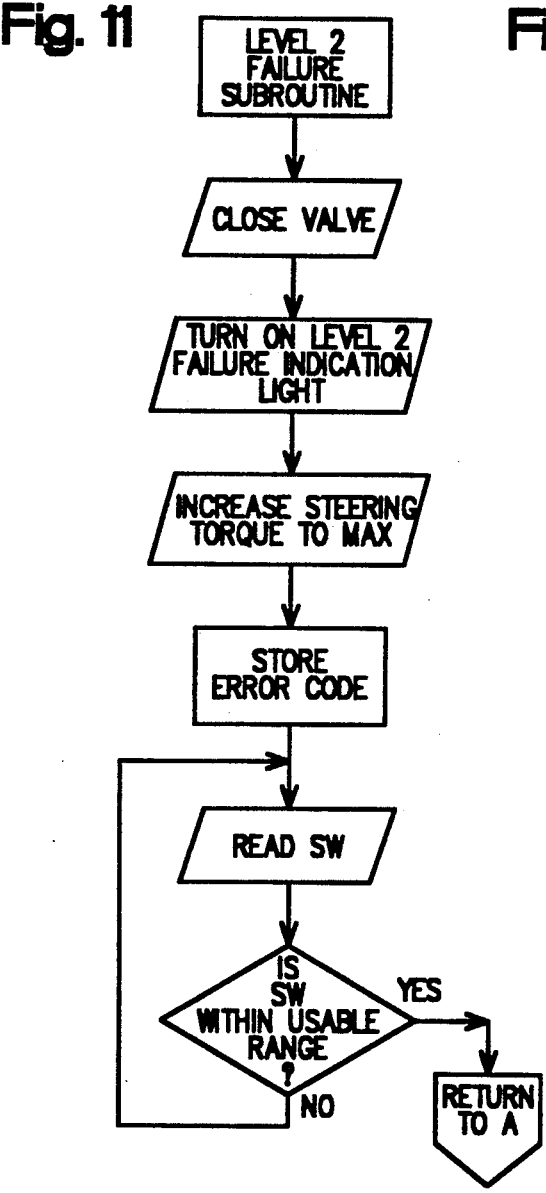
FIG. 11 is a flow chart illustrating another sensor failure subroutine of the system of FIG. 7.

If the position sensor 78 malfunctions, SW will not be within its usable range. The ECU 50 cannot control the steering motor 14 to turn the steerable vehicle wheels 16 in a meaningful fashion. Thus, the ECU 50 performs what is termed a level 2 failure subroutine, as shown by the flow chart of FIG. 11. The ECU 50 controls the hydraulic valve 62 to remain in, or move to, its central neutral position. A level 2 failure indication light is turned on by the ECU 50. The ECU 50 controls the electromagnetic friction brake 82 to increase steering torque to maximum. The failure indication light alerts the operator of the vehicle of the malfunction and the increased steering torque convinces the operator of the vehicle of the malfunction.

In the level 2 failure subroutine, the ECU 50 reads SW. The ECU 50 determines whether SW is within its usable range. If SW is not within its usable range, the ECU 50 continues to cycle by reading SW and determining whether it is within its usable range. Thus, the ECU 50 does not control the steering motor 14 for maneuvering. If SW is within its usable range, the ECU 50 returns to control the steering motor 14 such that the vehicle can be drive to service facilities.

However, referring to FIGS. 8A–8C, if SW, SA, and the absolute value of SA minus SB are all within their usable ranges, the ECU 50 determines whether the direction of the steerable vehicle wheels 16, which is a function of SW and SWZERO correspond to the desired direction, which is a function of SA and SAZERO. If the direction of the steerable vehicle wheels 16 corresponds to the desired direction, the ECU 50 controls the hydraulic valve 62 to remain in, or move to, its central neutral position.

If the direction of the steerable vehicle wheels 16 does not correspond to the desired direction, the ECU 50 controls the hydraulic valve 62 to move to permit hydraulic fluid from the hydraulic pump 66 to act on the steering motor 14. The movement of the hydraulic valve 62 is a function of SW, SWZERO, SA and SAZERO. Thus, the steerable vehicle wheels 16 are turned.

The ECU 50 performs a check of the outputs from the first, second and third potentiometers 36, 38 and 90. The ECU 50 operates what is termed a third sensor check subroutine, as shown by the flow chart in FIG. 13. The ECU 50 determines whether the absolute value of SA minus UNUSED is within a predetermined usable range. A typical usable range is 1.5 volts to 1.8 volts and 3.2 volts to 3.5 volts. If the absolute value of SA minus UNUSED is within its usable range, the ECU 50 determines whether the absolute value of SB minus UNUSED is within a predetermined usable range. A typical usable range is 1.5 volts to 1.8 volts and 3.2 volts to 3.5 volts. If the absolute value of SB minus UNUSED is within its usable range, the ECU 50 returns to normal operation.

However, if any of the first, second or third potentiometers 36, 38 and 90 are malfunctioning, either the absolute value of SA minus UNUSED or the absolute value of SB minus UNUSED will not be within their usable ranges. A level 1 failure indication light is turned on by the ECU 50 to alert the operator of the vehicle. The ECU 50 controls the electromagnetic friction brake 82 to increase the steering torque to high (not maximum). The failure indication light alerts the operator of the vehicle of the malfunction, and the increased steering torque convinces him of the malfunction. An electronic error code is stored by the ECU 50 to provide information for when the vehicle is serviced. The ECU 50 continues to control the steering motor 14, utilizing at least one of the non-malfunctioning first, second and third potentiometers 36, 38 and 90.

The ECU 50 again reads S1, S2, S3 and SW. The ECU 50 again determines whether SW, SA and the absolute value of SA minus SB are all within their usable ranges. The ECU 50 continues to utilize SA to control operation of the steering motor 14 while SA is within its usable range.

When the ECU 50 determines that SA is not within its usable range, the ECU 50 alternates to utilize SB. This alternation is an important aspect of the invention. The ECU 50 determines whether SB is within its usable range. If SB is within its usable range, the ECU 50 determines whether the absolute value of SA minus SB is within its usable range. If the absolute value of SA minus SB is within its usable range, the ECU 50 stores the value of SB as SBZERO and the value of SW and SWZERO. The values of SBZERO and SWZERO are utilized as the references for determining changes in the rotational position of the shaft 20 and the position of the steerable vehicle wheels 16, respectively.

The ECU 50 reads S1, S2, S3 and SW. The ECU 50 determines whether SW is within its usable range. If SW is not within its usable range, the ECU 50 performs the level 2 failure subroutine as described above. If SW is within its usable range, the ECU 50 determines whether SB is within its usable range. If SB is within its usable range, the ECU 50 determines whether the absolute value of SA minus SB is within its usable range. If the absolute value of SA minus SB is not within its usable range, the ECU 50 performs the level 1 failure subroutine a described above.

If the absolute value of SA minus SB is within its usable range, the ECU 50 determines whether the direction of the steerable vehicle wheels 16, which is a function of SW and SWZERO, corresponds to the desired direction, which is a function of SB and SBZERO. If the direction of the steerable vehicle wheels 16 corresponds to the desired direction, the ECU 50 controls the hydraulic valve 62 to remain in, or move to, its central neutral position. Thus, hydraulic fluid from the hydraulic pump 66 is not applied to the steering motor 14. The position of the steerable vehicle wheels 16 is unchanged.

If the direction of the steerable vehicle wheels 16 does not correspond to the desired direction, the ECU 50 controls the hydraulic valve 62 to move. The movement of the hydraulic valve 62 is a function of SW, SWZERO, SB and SBZERO. Thus, hydraulic fluid from the hydraulic pump 66 is applied to the steering motor 14. The position of the steerable vehicle wheels 16 is changed. The ECU 50 checks whether the first, second and third potentiometers 36, 38 and 90 are malfunctioning by performing the third sensor check subroutine, as described above.

The ECU 50 again reads S1, S2, S3 and SW. The ECU 50 again determines whether SW, SB and the absolute value of SA minus SB are within their usable ranges. If all of these are determined to be in the affirmative, the ECU 50 continues to utilize SB to control the steering motor 14.

If SB is determined to not be within its usable range, the ECU 50 alternates to utilize SA, as described above. However, if both SA and SB are not within their usable ranges, the ECU 50 determines whether UNUSED is within its usable range. If UNUSED is within its usable range, the ECU 50 will perform the level 1 failure subroutine, as described above. Thus, the ECU 50 will redesignate SA or SB such that the non-malfunctioning of the first, second and third potentiometers 36, 38 and 90 are utilized to control the steering motor 14.

Figure 12:
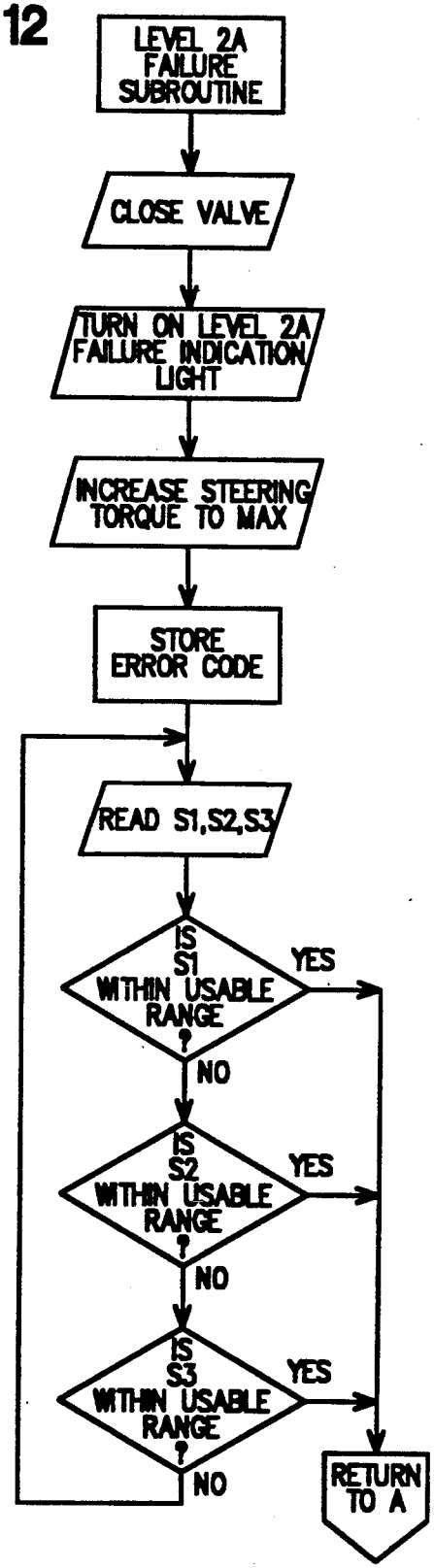
FIG. 12 is a flow chart illustrating still another sensor failure subroutine of the system of FIG. 7.

If SA, SB and UNUSED are all determined to not be within their usable range, the ECU 50 cannot control the steering motor 14 to turn the steerable vehicle wheels 16 in a meaningful manner. Thus, the ECU 50 performs what is termed a level 2A failure subroutine, as shown in the flow chart of FIG. 12. The ECU 50 controls the hydraulic valve 62 to remain in, or return to, its central neutral position. Thus, hydraulic fluid from the hydraulic pump 66 is not applied to the steering motor 14. The steering motor 14 does not turn the steerable vehicle wheels 16.

In the level 2A failure subroutine, the ECU 50 turns on a level 2A failure indication light. The ECU 50 controls the electromagnetic friction brake 82 to increase the steering torque to maximum. The failure indication light alerts the operator of the vehicle of the malfunction and the increased steering torque convinces the operator of the vehicle of the malfunction. The ECU 50 stores an error code which provides information regarding the malfunction when the vehicle is serviced.

The ECU 50 reads S1, S2 and S3. The ECU 50 determines whether either S1, S2 or S3 are within their usable ranges. If S1, S2 and S3 are all not within their usable range, the ECU 50 continues to cycle to read S1, S2 and S3 and determine whether S1, S2 and S3 are within their usable ranges. Thus, the ECU 50 does not control the steering motor 14 to turn the steerable vehicle wheels 16. If any of S1, S2 or S3 are within their usable range, the ECU 50 operates the steering motor 14 with the non-malfunctioning of the first, second and third potentiometers 36, 38 and 90, such that the vehicle can be driven to service facilities.

Although the invention has been described with reference to preferred embodiments, other modifications and alternations will be apparent to those skilled in the art upon reading and understanding this specification. For example, the steering motor 14 has been described as a hydraulic motor. An electric motor could be used in the alternative. Also, the apparatus 10 has been described as turning the steerable vehicle wheels 16. The apparatus 10 could be utilized to actuate a motor for pivoting an articulated vehicle. Such articulated vehicles being known in the art.

From the above description of the invention, those skilled in the art will perceive improvements, changes and modifications. Such improvements, changes and modifications within the skill of the art are intended to be covered by the appended claims.

Having described the invention, the following is claimed:

1. A system for controlling a steering motor for turning a steerable vehicle wheel, said system comprising:
   a shaft rotatable about its longitudinal axis;
   a plurality of sensors, each of said plurality of sensors providing a signal, the signal of each of said plurality of sensors being indicative of the rotational position of said shaft for different portions of a revolution of said shaft, the signal of each of said plurality of sensors being non-indicative of the rotational position of said shaft for different portions of a revolution of said shaft; and
   a control means for operating the steering motor alternately in response to a first signal provided by one of said plurality of sensors for a first portion of rotation of said shaft and a second signal provided by another of said plurality of sensors for a second portion of rotation of said shaft;
   wherein said one of said plurality of sensors is a first potentiometer and said another of said plurality of sensors is a second potentiometer.

2. A system as set forth in claim 1 wherein the first signal corresponds to a signal provided by said first potentiometer and during rotation of said shaft, has approximately a sawtooth waveform, the second signal corresponds to a signal provided by said second potentiometer and during rotation of the shaft, has approximately a sawtooth waveform, the second signal being approximately 180 degrees out of phase from the first signal.

3. A system for controlling a steering motor for turning a steerable vehicle wheel, said system comprising:
   a shaft rotatable about its longitudinal axis;
   a plurality of sensors, each of said sensors providing a signal, which has an unique characteristic for each rotational position of said shaft over a substantial portion of a revolution of said shaft, for indicating the rotational position of said shaft within the respective portion of the revolution of said shaft and being non-indicative of the rotational position of said shaft outside of the respective portion of the revolution of said shaft, each respective portion of the revolution of said shaft within which one of said sensors is indicative of the rotational position of said shaft being different from another respective portion of the revolution of said shaft for which another sensor is indicative of the rotational position of said shaft such that no more than one sensor is non-indicative of the rotational position of said shaft for each rotational position of said shaft; and
   a control means for operating the steering motor in response to a first signal provided by one of said plurality of sensors for a first portion of rotation of said shaft and a second signal provided by another of said plurality of sensors for a second portion of rotation of said shaft.

4. A system as set forth in claim 3, wherein each signal provided by said sensors being a voltage output which constantly varies during rotation of said shaft and which has a unique value for each rotational position of said shaft over the respective portion of the revolution of the shaft for which a respective sensor is indicative of the rotational position of said shaft.

5. A system as set forth in claim 3 wherein said control means determines whether the steering motor will be controlled in response to the first or second signal.

6. A system as set forth in claim 3 wherein said system controlling said steering motor responsive to rotation of a vehicle steering wheel, said shaft being connected to the vehicle steering wheel, said shaft being rotatable about its longitudinal axis upon rotation of the vehicle steering wheel.

7. A system for controlling a steering motor for turning a steerable vehicle wheel, said system comprising:
   a shaft rotatable about its longitudinal axis;
   a plurality of sensors, each of said plurality of sensors providing a signal, the signal of each of said plurality of sensors being indicative of the rotational position of said shaft for different portions of a revolution of said shaft, the signal of each of said plurality of sensors being non-indicative of the rotational position of said shaft for different portions of a revolution of said shaft; and
   a control means for operating the steering motor alternately in response to a first signal provided by one of said plurality of sensors for a first portion of rotation of said shaft and a second signal provided by another of said plurality of sensors for a second portion of rotation of said shaft;

wherein said plurality of sensors includes first, second and third sensors, the first and second signals being initialized as corresponding to the signals provided by said first and second sensors.

8. A system as set forth in claim 7 wherein each of the signals provided by said three sensors has a waveform frequency of one cycle per revolution of said shaft, each of the signals provided by said three sensors being approximately 120° out of phase from the other of the signals provided by said three sensors.

9. A system as set forth in claim 7 including a steering sensor means for producing a signal indicative of operation of the steering motor, said control means receiving and utilizing the signal indicative of operation of the steering motor to control operation of said steering motor.

10. A system as set forth in claim 7 wherein each different portion of a revolution of said shaft for which one of said plurality of sensors is indicative of the rotation of the shaft partially overlaps the other different portions of a revolution of said shaft for which one of said plurality of sensors is indicative of the rotation of the shaft.

11. A system as set forth in claim 7, wherein said control means utilizes the plurality of signals to evaluate if either of said first or second sensors is malfunctioning.

12. A system as set forth in claim 11, wherein when said first sensor malfunctions said control means designates that said first and second signals correspond to the signals provided by said second and third sensors, when said second sensor malfunctions said control means designates that said first and second signals correspond to the signals provided by said first and third sensors.

13. A system as set forth in claim 11, including means for providing a force resisting rotation of the shaft if any of the sensors malfunctions.

14. A system for controlling a steering motor for turning a steerable vehicle wheel in response to turning of a vehicle steering wheel, said system comprising:

a shaft angularly rotatable about its longitudinal axis upon rotation of the steering wheel;

a plurality of sensors, each of said plurality of sensors providing a signal, the signal of each of said plurality of sensors constantly varying and being indicative of the rotational position of said shaft over different substantial portions of a revolution of said shaft such that at least one signal is indicative of the rotational position of said shaft for each rotational position of said shaft, the signal of each of said plurality of sensors being non-indicative of the rotational position of said shaft for different and nonoverlapping portions of the revolution of said shaft; and a control means for operating the steering motor, said control means including means for receiving the plurality of signals and for utilizing only a first signal of the plurality of signals to operate the steering motor for a first portion of rotation of the shaft and only a second signal of the plurality of signals to operate the steering motor for a second portion of rotation of the shaft.

15. A system as set forth in claim 14 wherein said plurality of sensors includes a plurality of potentiometers.

16. A system as set forth in claim 14 including a steering sensor means for providing a signal indicative of the direction of the steerable vehicle wheel, said control means including means for receiving the signal indicative of the direction of the steerable vehicle wheel, said control means utilizing the signal indicative of the direction of the steerable vehicle wheel for control of the steering motor.

17. A system as set forth in claim 14 wherein each of the plurality of signals provided by one of said plurality of sensors is provided independently of operation of the other of said plurality of sensors, malfunction of one of said plurality of sensors not effecting the signals provided by the other of said plurality of sensors.

18. A system for controlling a steering motor for turning a steerable vehicle wheel, said system comprising:

a shaft rotatable about its longitudinal axis;

a plurality of sensors, each of said plurality of sensors providing a signal, the signal of each of said plurality of sensors being indicative of the rotational position of said shaft for different portions of a revolution of said shaft, the signal of each of said plurality of sensors being non-indicative of the rotational position of said shaft for different portions of a revolution of said shaft;

a control means for operating the steering motor alternately in response to a first signal provided by one of said plurality of sensors for a first portion of rotation of said shaft and a second signal provided by another of said plurality of sensors for a second portion of rotation of said shaft; and a steering sensor means for producing a signal indicative of operation of the steering motor, said control means receiving and utilizing the signal indicative of operation of the steering motor to control operation of said steering motor.

19. A system for controlling a steering motor for turning a steerable vehicle wheel in response to turning of a vehicle steering wheel, said system comprising:

a shaft angularly rotatable about its longitudinal axis upon rotation of the steering wheel;

a plurality of sensors, each of said plurality of sensors providing a signal, the signal of each of said plurality of sensors being indicative of the rotational position of said shaft for different portions of a revolution of said shaft such that at least one signal is indicative of the rotational position of said shaft for each rotational position of said shaft, the signal of each of said plurality of sensors being non-indicative of the rotational position of said shaft for different and non-overlapping portions of the revolution of said shaft; and a control means for operating the steering motor, said control means including means for receiving the plurality of signals and for alternately utilizing a first and second signal of the plurality of signals to operate the steering motor;

wherein the portion of revolution of said shaft for which the first signal is indicative of the rotational position of said shaft partially overlaps the portion of revolution of said shaft for which the second signal is indicative of the rotational position of said shaft, said control means utilizing the first signal to operate the steering motor for rotational positions of said shaft within the partial overlap when the partial overlap was encountered by rotation of the shaft from a non-overlapping angular extent of rotation of said shaft for which the first signal is indicative of the rotational position of the shaft, said control means utilizing the second signal to operate the steering motor for rotational positions of said shaft within the partial overlap when the partial overlap was encountered by rotation of the shaft from a non-overlapping angular extent of rotation of said shaft for which the second signal is indicative of the rotational position of the shaft.

* * * * *